(12) United States Patent
Lehmann et al.

(10) Patent No.: US 7,547,889 B2
(45) Date of Patent: Jun. 16, 2009

(54) PHOTON DETECTION DEVICE

(75) Inventors: Michael Lehmann, Winterthur (CH); Rolf Kaufmann, Zurich (CH); Max Erick Busse-Grawitz, Alpnach Dorf (CH)

(73) Assignee: CSEM Centre Suisse D'Electronique Et De Microtechnique SA, Neuchatel (CH)

( * ) Notice: Subject to any disclaimer, the term of this patent is extended or adjusted under 35 U.S.C. 154(b) by 0 days.

(21) Appl. No.: 12/075,815

(22) Filed: Mar. 14, 2008

(65) Prior Publication Data

US 2008/0224054 A1    Sep. 18, 2008

Related U.S. Application Data

(60) Provisional application No. 60/907,012, filed on Mar. 16, 2007.

(51) Int. Cl.
*G01T 1/24* (2006.01)
*H03F 1/34* (2006.01)

(52) U.S. Cl. .......................... 250/370.01; 250/370.08; 250/370.09; 250/370.11; 330/95; 330/110; 330/291; 330/293; 330/308

(58) Field of Classification Search ............ 250/370.01, 250/370.08, 370.09, 370.11; 330/95, 110, 330/291, 293, 308
See application file for complete search history.

(56) References Cited

U.S. PATENT DOCUMENTS 6,246,282 B1 * 6/2001 Oono et al. .................. 330/86
6,821,808 B2 * 11/2004 Nakamura et al. ............ 438/57
7,339,175 B1 * 3/2008 Drummond et al. ..... 250/370.01

OTHER PUBLICATIONS

Wang, X. and W. Winnifred (2006). "A High Dynamic Range CMOS Image Sensor with In-Pixel Light-to-Frequency Conversion", IEEE Transactions on Electron Devices (53) 12: 2988-92.*
Giersch et al.: "The influence of Energy Weighting on X-ray imaging Quality", published in Nucl. Instr. Meth. A , 531 (2004), pp. 68-74.
Lechner: "Development of a Radiation hard Pixel Analog Block for the CMS Vertex Detector and search for rare Decays at CMD-2", Dissertation at the Swiss Federal Institute of Technology, Zurich, Oct. 1998.

(Continued)

*Primary Examiner*—David P Porta
*Assistant Examiner*—Casey Bryant
(74) *Attorney, Agent, or Firm*—Weingarten, Schurgin, Gagnebin & Lebovici LLP

(57) ABSTRACT

The present invention discloses a photon detection device that is adapted to detect at least one packet of photons. The photon detection device may include a photon-sensitive element having an output, an amplifier; and a non-linear feedback (NLF) element. The photon-sensitive element generates charges upon the engagement of at least one photon packet therewith. An increase from a first number of charges in the photon-sensitive element to a second number of charges, results in a corresponding increase of a first reset time required to reset the first number of charges to a respective second reset time required to reset the second number of charges in the photon-sensitive element, whereby the reset time is non-linear to with respect to an increase in the charges. Additional and alternative embodiments are described and claimed.

11 Claims, 8 Drawing Sheets

OTHER PUBLICATIONS

Llopart et al.: "Medipix2, a 64k pixel readout chip with 55 μm square elements working in single photon counting mode", Nuclear Science Symposium Conference Record, 2001 IEEE, vol. 3, Issue, Nov. 4-10, 2001, pp. 2279-2283.

Krummenacher: "Pixel detectors with local intelligence: an IC designer point of view", published in Nuclear Instruments and Methods in Physics Research Section A, vol. 305, pp. 527-532. Publication Date: Aug. 1991.

* cited by examiner

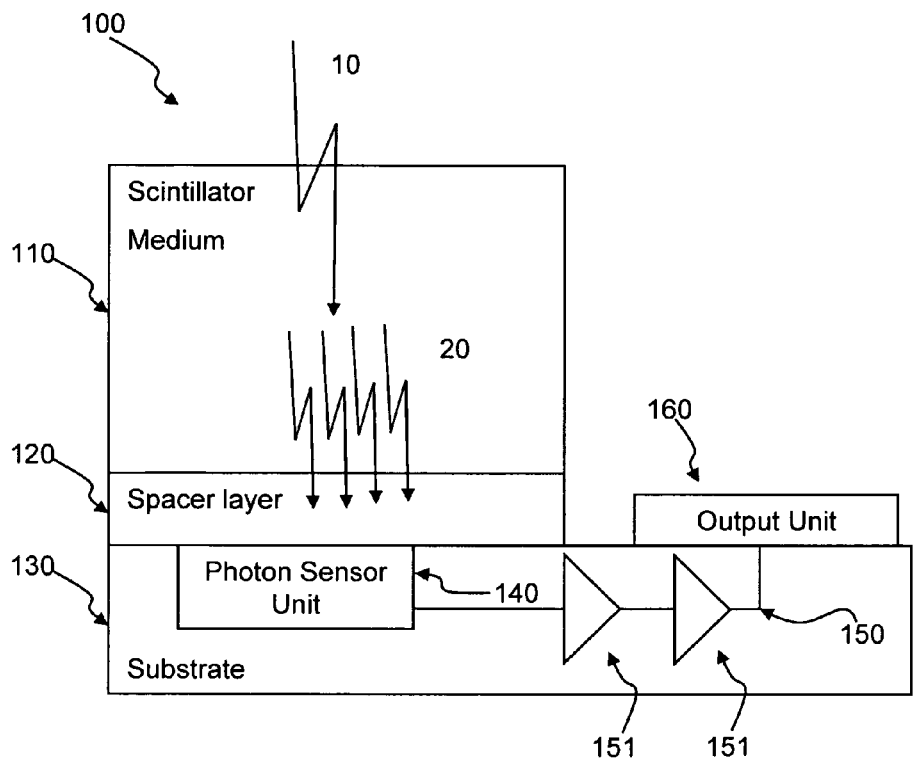
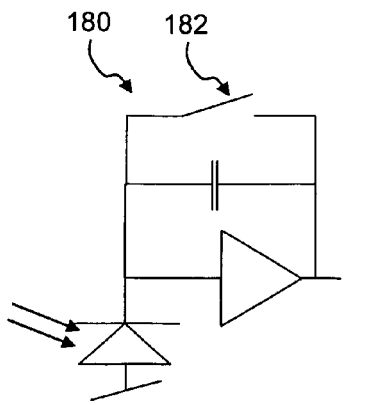
FIG. 1B
(prior art)
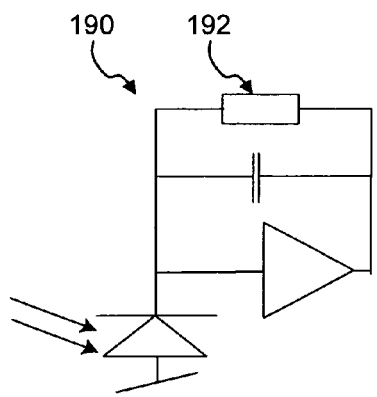
FIG. 1C
(prior art)
FIG. 1A (Prior Art)

PHOTON DETECTION DEVICE

CROSS-REFERENCE TO RELATED APPLICATIONS

This patent application claims priority from U.S. Provisional Patent Application No. 60/907,012 filed on Mar. 16, 2007, the Application which is incorporated herein by reference in its entirety.

FIELD OF INVENTION

The present invention relates to the field of photon detection and more specifically, to devices enabling such photon detection.

BRIEF DESCRIPTION OF THE DRAWINGS

These and further features and advantages of the invention will become more clearly understood in the light of the ensuing description of a some embodiments thereof, given by way of example only, with reference to the accompanying figures, wherein:

FIG. 1A is a schematic block diagram illustration of an X-ray imager as known in the art;

FIG. 1B is a schematic block diagram illustration of a photon detection device as known in the art, wherein the photon detection device is adapted to count photons and employs a discrete reset mechanism;

FIG. 1C is as schematic block diagram illustration of another photon detection device as known in the art employing a continuous reset mechanism, wherein the photon detection device is adapted to count photons;

Figure 1D:
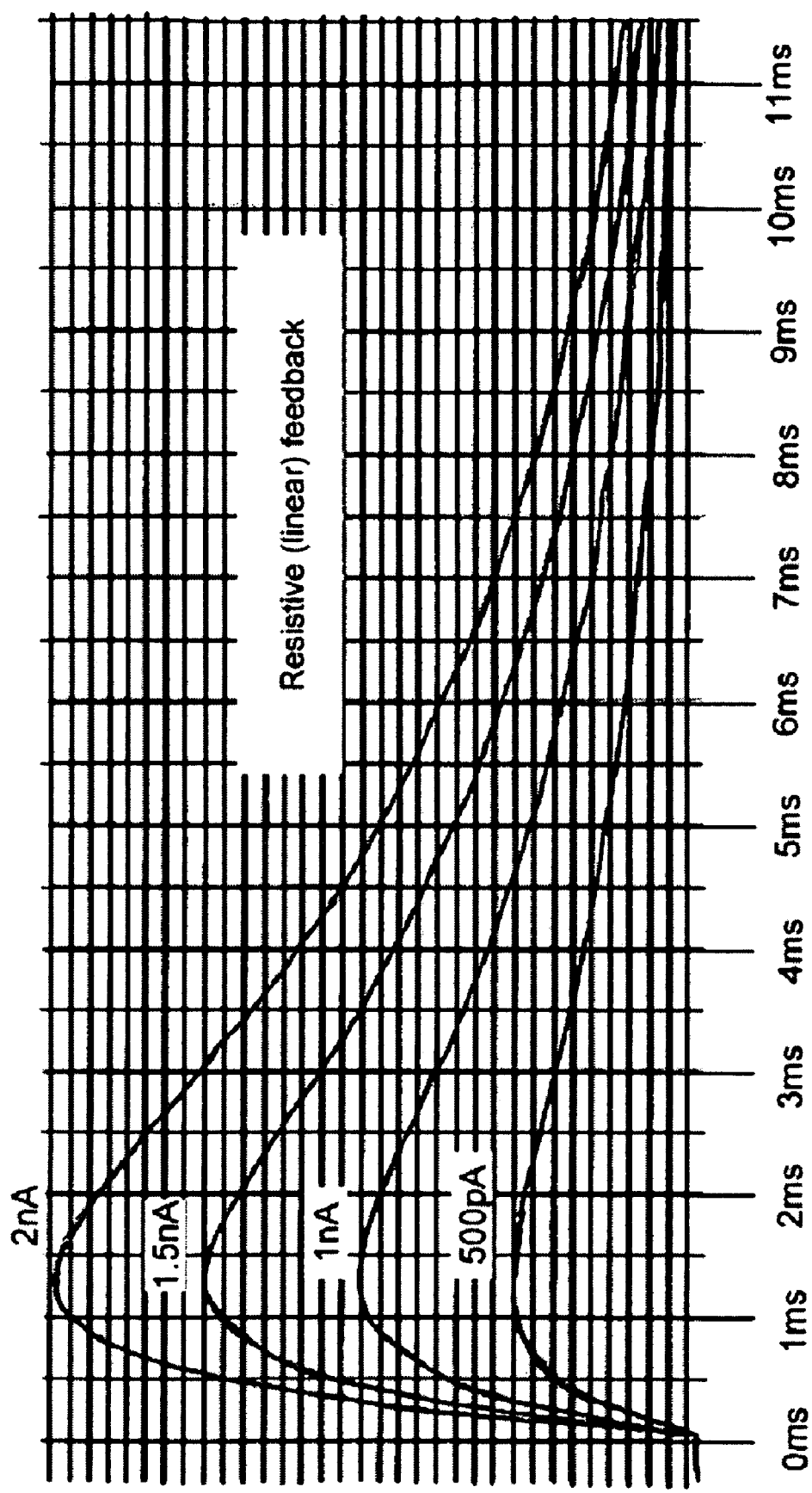
FIG. 1D is a schematic illustration of curves delineating current pulses and the corresponding reset times when employing a photon detection device as known in the art.

The drawings taken with description make apparent to those skilled in the art how the invention may be embodied in practice.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate identical or analogous but may not be referenced in the description for all figures.

BACKGROUND OF THE INVENTION

The absorption coefficient of electromagnetic radiation such as, for example, X-rays, in most materials strongly depends on the radiation's photon energy (E) and decreases approximately exponentially of the order $E^{-3}$ when one neglects the K absorption edges, which may also be referred to as the radiation's absorption limit.

The contrast of X-ray images arises from absorption differences between the materials of the object being imaged, i.e. from differences between the materials' absorption coefficients. The lower the energy of the X-ray radiation engaging with the object, the higher is the contrast of the image thereof, provided that some of the low energy photons still permeate the object. Accordingly, an increase of the energy of the X-ray radiation results in a decrease of the image's contrast.

X-ray tubes as known in the art emit X-ray radiation of a relatively broad energy distribution due to the Bremsstrahlung (or "braking radiation")-spectrum to which the X-ray radiation may be subjected to. By employing suitable filters, some of the spectrum can be filtered out. Such filtering however, is always at the expense of the radiation's flux density and may thus render such filtered X-ray radiation commercially inapplicable.

Detection of X-ray radiation is accomplished in a different way than detection of radiation of the visible spectrum, as silicon semiconductors can not be employed as detection means for X-ray radiations, since such radiation engaging with a silicon semiconductor based detection means would either pass through the silicon semiconductor or damage or disturb at least some of the components thereof. In the art, a way to detect X-ray radiation is to convert photons of the X-ray radiations into visible photons, which are detectable by commonly used photon detection devices based on silicon semiconductors. Conversion of photons of X-ray radiation into visible photons may be accomplished by employing a scintillator medium (e.g. a scintillator crystal), which absorbs photons of the X-ray radiation and emits in response energy in the form of visible photons. Accordingly, a photon detection device used in association with the scintillator medium has to be sensitive to radiation emitted by the same. Fortunately, the semiconductor silicon is actually sensitive in the frequency spectrum of the photons emitted by common scintillator media.

The energy of one photon of X-ray radiation can ionize several scintillator molecules. One photon of X-ray radiation may thus cause the scintillator medium to emit numerous packets of visible photons (e.g. hundreds or thousands of visible photons, whereby the number of visible photons emitted by the scintillator medium depends on the energy of the same photon of X-ray radiation. The scintillator medium is optically coupled to the photon detection device in a manner known in the art by, for example, employing a fiber plate that couples the photon detection device with the scintillator medium, or by abutting the scintillator medium to the photon detection device.

The main characteristics of the scintillator medium are its efficiency, the conversion ratio, decay time and the output wavelength. The efficiency is the probability of capturing an incoming photon of X-ray radiation and depends on the material but also on the thickness of the scintillator medium, i.e. a thicker layer will collect more of the photons. Efficiencies can rise, e.g., up to 95%. The conversion rate gives the amount of generated visible photons versus the energy of the photon. In a first approximation, the correlation is linear, i.e. when for example, a 25 keV X-ray photon may generate 500 visible photons; a 50 keV-photon may generate 1000 visible photons. The decay time tells how fast the excited molecules release their electrons and send out the visible photons. The shorter this decay time, the brighter is the light flash emitted by the scintillator medium and the more visible photons corresponding to X-ray radiation can be detected by the underlying photon detection device. A common decay time is for example 1 µs.

It should be noted that the term "visible photon", "visible spectrum" and the like as used herein encompasses the spectrum of near-infrared light to soft-ultraviolet light (e.g. from 1000 nm to 200 nm).

Reference is now made to FIG. 1A. An X-ray sensor 100 used in the art comprises a scintillator medium 110, a substrate 130, a photon sensor unit 140 and an output pad 160. X-ray sensor optionally includes a spacer medium 120 which may be sandwiched between substrate 130 and Scintillator medium 110. Scintillator medium 110, which may be implemented by a suitable scintillator crystal, is adapted to convert X-ray radiation 10 engaging therewith into radiation of the visible spectrum, which is hereinafter referred to as "visible photons" 20. Photon sensor unit 140, which may be implemented by means of a photon-sensitive film or a semiconductor (e.g. a photodiode), is positioned relative to scintillator medium 110 to be able to detect at least some of visible photons 20. The higher the energy of X-ray radiation 10, the more visible photons 20 are generated by Scintillator medium 110 and the more visible photons 20 are therefore impinging on photon sensor unit 140 for each respective pixel.

If photon sensor unit 140 is implemented by means of a semiconductor, then photon sensor unit 140 may be operatively connected to an output unit 160 via an amplification path 150 comprising one or more amplifiers 151 Moreover, photons are converted into corresponding electronic signals by generating electron-hole pairs in the semiconductor and collected during a certain time frame (hereinafter referred to as "integration time") onto a capacitance the respective charge carriers to generate a corresponding voltage or current for readout.

The integration time is set such that enough charge carriers are collected in and/or on the capacitance to obtain satisfying readout accuracy. However, the integration of charge carriers results in that the photons of radiation 10 are weighted in accordance to their energy. Accordingly, an increase in the energy of radiation 10 results in an increase in the weighting of corresponding visible photons 20. However, as outlined hereinabove, an increase in energy of X-ray radiation 10 above an energy-threshold where most of X-ray radiation 10 penetrates the object results in a decrease of the contrast of the object's image. Thus, employing high energy X-ray radiation 10 in order to obtain more visible photons 20 is detrimental to the desire of obtaining an image of high contrast as shown by Giersch et al. in "The influence of Energy Weighting on X-ray imaging Quality", which is in incorporated by reference in its entirety herein and published in Nucl. Instr. Meth. A 531 (2004)64-74. To overcome this problem, Giersch et al. disclose a technique for weighing X-ray photons according to their respective energy. The technique improves the image quality (in terms of signal-to-noise ratio compared to integrating photon sensor units) up to a factor of 1.5. In the presence of scattered radiation the usability of lower photon energies is limited. For this case Giersch et al. derived an adapted weighting function, and further studied the influence of detector properties on the image quality improvement. The results of the study show that the energy bin size (i.e. number of energy channels) of the imaging system has a comparatively small impact on the benefit. Additionally, with optimized bin border positions, it is possible to achieve about 90% of maximum improvement with only three bins.

As a further alternative, X-Ray photons 10 may be counted instead of integrated. Counting x-Ray photons 10 implies that the X-Ray photons 10 are equally weighted, independent to their respective energy. To enable counting X-Ray photons 10, photon sensor unit 140 ought to be sensitive enough to detect two subsequent visible photon bursts 20 engaging with photon sensor unit 140 at a time interval that is close to the decay time of the scintillator, i.e., photon sensor unit 140 should have a detection resolution generally equal or shorter than said decay time. Various signal processing methods can be employed to increase sensitivity. Photon sensor unit 140 enabling the counting of X-Ray photons 10 generally employ a linear transfer function, whereby an electronic pulse resulting from a detection of at least one X-Ray photon 10 may be filtered by a resistor-capacitor (RC) filter and/or a capacitor-resistor (CR) filter to reduce noise incorporated in the electronic pulse.

A detailed description of such a detection means employing a linear transfer function is given by in "Development of a Radiation hard Pixel Analog Block for the CMS Vertex Detector and search for rare Decays at CMD-2" to Lechner, Dissertation at the Swiss Federal Institute of Technology, Zurich, October 1998, which is incorporated herein by reference in its entirety.

Additional reference is now made to FIG. 1B and FIG. 1C. Generally, only a few (hundreds to thousands) charge carriers, e.g. electrons, are collected onto capacitances respective to photon detection devices 180 and 190. These charge carriers will generate only a very small signal on the capacitance of the photodiode. For example, if a capacitance has 100 fF, 500 electrons will generate a signal of 0.8 mV. Therefore the signal has to be amplified for further processing. An integrating amplifier may serve the need of amplification. In an integrating amplifier, the charge is transferred from the large photodiode capacitance to a much smaller integrating capacitance in the feed-back path, e.g., 10 fF instead of 100 fF will thus generate a ten times larger output of 8 mV. As a consequence, an integrating amplifier produces larger output signals than the simple charge collected on the photodiode. If however the integrating amplifier just integrates the charge, it will saturate after a given number of events. The integrating amplifier should therefore operate in association with a discretely (FIG. 1B) or continuously (FIG. 1C) operating reset switch 182 and 192, respectively. Both switches have specific disadvantages: With the discretely operating reset switch, it must be ensured that the total charge collected during the integration time will not saturate the amplifier. On the other hand, the continuous reset needs a resistor in parallel with the capacitance; their RC-constant must be equal or even higher than the decay time of the scintillator medium otherwise the pulse will be suppressed already in this amplification stage. With an integration capacitance of for example, 10 fF, the resistor value has to be 100 MΩ. Realizing such a high resistance value in a Complementary Metal Oxide Semiconductor (CMOS) process is difficult, especially because the space is limited in the pixel. A high resistance value can be achieved by operating a MOS transistor in weak inversion. The actual impedance of such a resistor is however very sensitive to small production variations, which leads to sensitivity variations from pixel to pixel Photo Response Non Uniformity (PRNU). Such variations may be compensated by a calibration on the pixel level.

A further implementation of photon sensor unit 140 employing the technique of merely counting X-Ray photons 10 is disclosed by Liopart et al. in "Medipix2, a 64 k pixel read out chip with 55 μm square elements working in single photon counting mode", Nuclear Science Symposium Conference Record, 2001 IEEE, Volume 3, Issue, 4-10 Nov. 2001 Page(s): 1484-1488 vol. 3, which is incorporated herein by reference in its entirety. The Medipix2 chip detector consist of 256*256 identical elements, each working in single photon counting mode for positive or negative input charge signals. Each pixel cell contains around 500 transistors and occupies a total surface area of 55 μm*55 μm. A 20 μm width octagonal opening connects the detector and the preamplifier input via bump-bonding. The preamplifier feedback provides compensation for detector leakage current on a pixel by pixel basis. Two identical pulse height discriminators are used to create a pulse if the preamplifier output falls within a defined energy window. These digital pulses are then counted with a 13-bit pseudo-random counter. The counter logic, based in a shift register, also behaves as the input/output register for the pixel. Each cell also has an 8-bit configuration register which allows masking, test-enabling and 3-bit individual threshold adjust for each discriminator. The chip can be configured in serial mode and read out either serially or in parallel. The chip is designed and manufactured in a 6-metal 0.25 μm CMOS technology.

As an alternative to integrating charge carriers, visible photons 20 can be converted directly into an output voltage by employing a transimpedance amplifier. The output voltage is dependent on the resistance in the feed-back path. More specifically, the dependency of an electronic current signal "$I_{sig}$" to a current pulse "$I_{pulse}$" induced in photon sensor unit 140 due to the engagement of visible photons 10 therewith, may be expressed, for example, by the following equation:

$$I_{sig} = I_{pulse} \cdot e^{-t/\tau} \qquad (1)$$

wherein, "$\tau$" represents the time constant of the exponential decay of $I_{pulse}$.

Correspondingly, if the maximum value of $I_{pulse}$ equals for example, 80 pAmpere and the time constant $\tau$ equals, for example, 1 μs, then the equation becomes:

$$I_{sig} = 80p\text{Ampere} \cdot e^{-t/1\,\mu s} \qquad (2)$$

whereby an integration of the current pulse of, e.g., 80 pAmpere, over time yields a charge of 80 pAmpere*1 μs=0.08 fAs [femtoampere-seconds]=8*10⁻¹⁴ As [ampere seconds], which correspond to the charge of 500 electrons. Consequently, in order to generate a voltage signal of the same amplitude of 8 mV the resistance has to be 100 MΩ, which is way too high to be achievable in a pixel unit. The signal corresponding to the output voltage can be readout at any time but the signal is noisy due to the often small photon flux and the therefore small current flux. If the signal has a certain bandwidth, the signal-to-noise ratio can be increased by adding suitable filters, which reduce the out-of-band noise.

Another solution is to use the amplifier in open-loop configuration: The amplifier would directly amplify the signal on the photodiode, e.g., if the amplifier has a gain G of, for example, 100, and the capacitance of the photon sensor unit 140 equals, for example, 100 fF, then the voltage signal of the capacitance of the photo sensor would be amplified to manageable peak of 80 mV as outlined in the following equation:

$$\left.\frac{q[fAs]}{C[fF]}\right| * G = 80\,\text{mV} \qquad (3)$$

As a consequence, employing an amplifier in open-loop configuration seems to be the ideal solution. To facilitate this solution, two issues have to be addressed: 1) the photodiode again has to be properly, and 2) the open-loop amplifier needs a biasing so that the input range thereof is adapted to the photodiode resetting. However, biasing of the photodiode (e.g. resetting the charges thereof) is associated with the same problems as biasing the integrating amplifier, as outlined hereinabove with reference to FIG. 1B and FIG. 1C. Correspondingly, employing a discretely operating reset switch may cause saturation of the photodiode, whereas employing a continuously operating reset switch may necessitate employing a resistor having a relative high resistive value. Moreover, since resetting is not achieved by employing feedback from the amplifier itself, it may be difficult to reach an optimum working point for the circuit. For example, if the biasing is only 100 mV apart from the optimum point, then an amplifier having gain G of 100 would have an output of 10 V, and the photodiode would therefore already be saturated. An implementation of photon sensor unit 140 addressing both issues is disclosed by Krummenacher in "Pixel detectors with local intelligence: an IC designer point of view", incorporated herein by reference in its entirety, published in Nuclear Instruments and Methods in Physics Research Section A, Volume 305, Issue 3, p. 527-532. Publication Date: 08/1991.

The time required for resetting the charges in photon sensor units 140 employing a resistive reset mechanism is schematically illustrated in FIG. 1D. The term linear also encompasses the term "substantially linear".

SUMMARY OF SOME EMBODIMENTS OF THE INVENTION

Embodiments of the present invention disclose a photon detection device adapted to detect at least one packet of photons. The photon detection device may include: a photon-sensitive element having an output, an amplifier; and a non-linear feedback (NLF) element. The photon-sensitive element generating charges upon the engagement of at least one photon packet therewith. An increase from a first number of charges in the photon-sensitive element to a second number of charges, results in a corresponding increase of a first reset time required to reset the first number of charges to a respective second reset time required to reset the second number of charges in the photon-sensitive element. Moreover, the amplifier and the NLF element are responsively coupled to the photon-sensitive element, such that a first ratio between the first reset time and the first number of charges is higher than a second ratio between the second reset time and the second number of charges, at least up to a number of $N_L$ charges.

In embodiments of the invention, the NLF element is embodied by at least one of the following devices: a diode; and a transistor.

In some embodiments of the invention, the number of charges in the photon-sensitive element is reset within less than 100 µs, and preferably within less than 60 µs.

In some other embodiments of the invention, the number of charges in the photon-sensitive element is reset within less than 10 µs, and preferably within less than 6 µs.

In embodiments of the invention, the amplifier is designed to invert a change in the voltage at the output of the photon-sensitive element and to effect a gain of, e.g., at least 100.

In embodiments of the invention, the amplifier is implemented by means of at least one set of transistors. Each set comprises at least one n-type and at least one p-type transistor, wherein the transistor type that is operatively coupled to the output of the photon-sensitive element depends on the charges collected in the photon-sensitive element. Each transistor of each set may be implemented by both one of a metal-oxide field-effect transistor (MOSFET) and a junction field-effect transistor (JFET).

In some embodiments of the invention, the at least one set of transistors is implemented by a p-type MOSFET and by an n-type MOSFET.

In embodiments of the invention, the at least one buffer is operatively coupled to the amplifier's output. The at least one buffer and the photon detection device constitute a pixel unit.

In embodiments of the invention, the pixel unit employs maximal four transistors.

In embodiments of the invention, the photon detection device is to detect photons emitted by a scintillator media.

In embodiments of the invention, the photon-sensitive element is adapted to detect photons outside the visible spectrum.

In embodiments of the invention, the NLF element employs a non-linear current-to-voltage conversion, the conversion behaving in accordance to a logarithmic-function.

DESCRIPTION OF SOME EMBODIMENTS OF THE INVENTION

Photons of the visible spectrum, which may travel in packets, engage with a photon-sensitive element (e.g. a photodiode) and may cause the generation and subsequent collection of charges therein, whereby the amount of charges corresponds to the number of photons, i.e., energy, of each packet. Since however the amount of charges collectable by the photon-sensitive element is limited, collecting the charges without resetting their number may result in saturation of the photodiode and thus render the same inapplicable for the counting of the number of photon packets. It should be noted that a "photon packet" may include at least one photon.

Embodiments of the present invention comprise a photon detection device adapted to count the number of photon packets engaging with a photodiode of the device. Besides the photon-sensitive element, the photon detection device may comprise an amplifier and a non-linear-feedback (NLF) voltage-to-current converting element. The amplifier and the NLF element are responsively coupled to the photodiode such that the required reset time is disproportional or non-linear to the amount of charges being reset.

More specifically, an increase from a first number of charges in the photon-sensitive element to a second number of charges, results in a corresponding increase of a first reset time required to reset the first number of charges to a respective second reset time required to reset the second number of charges in the photon-sensitive element. The amplifier and said NLF element are responsively coupled to the photon-sensitive element, such that a second ratio between the second reset time and the second number of charges is smaller than a first ratio between the first reset time and the first number of charges. Accordingly, the first ratio between the first reset time and the first number of charges is higher than the second ratio between the second reset time and the second number of charges, at least up to a number of $N_L$ charges. A larger quantity of charges may thus be reset more quickly compared to the time required if a linear feedback element was employed. As a consequence, the photon detection device according to embodiments of the invention is therefore adapted to detect more photon packets within a certain time span than photon detection devices used in the art. The photon detection device according to embodiments of the invention may therefore enable a more accurate counting of photon packets than photon detection devices used in the art, whilst the higher counting accuracy is not achieved at the expense of more space.

It should be noted that terms like "reset" and grammatical variations thereof also encompass the term "substantially reset" and may in some embodiments of the invention refer to the act of nullifying the number of charges in a device or element or unit, or to reset the number of charges back to a state of a given number of charges.

It should be understood that an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions.

It should be understood that the phraseology and terminology employed herein is not to be construed as limiting and is for descriptive purpose only.

The principles and uses of the teachings of the present invention may be better understood with reference to the accompanying description, figures and examples.

It should be understood that the details set forth herein do not construe a limitation to an application of the invention. Furthermore, it should be understood that the invention can be carried out or practiced in various ways and that the invention can be implemented in embodiments other than the ones outlined in the description below.

It should be understood that the terms "including", "comprising", "consisting" and grammatical variants thereof do not preclude the addition of one or more components, features, steps, integers or groups thereof and that the terms are not to be construed as specifying components, features, steps or integers.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

If the specification or claims refer to "an additional" element, that does not preclude there being more than one of the additional element.

It should be understood that where the claims or specification refer to "a" or "an" element, such reference is not to be construed as there being only one of that element.

It should be understood that where the specification states that a component, feature, structure, or characteristic "may", "might", "can" or "could" be included, that particular component, feature, structure, or characteristic is not required to be included.

The descriptions, examples, methods and materials presented in the claims and the specification are not to be construed as limiting but rather as illustrative only.

Meanings of technical and scientific terms used herein ought to be commonly understood as by one of ordinary skill in the art to which the invention belongs, unless otherwise defined.

The present invention can be implemented in the testing or practice with methods and materials equivalent or similar to those described herein.

Figure 2:
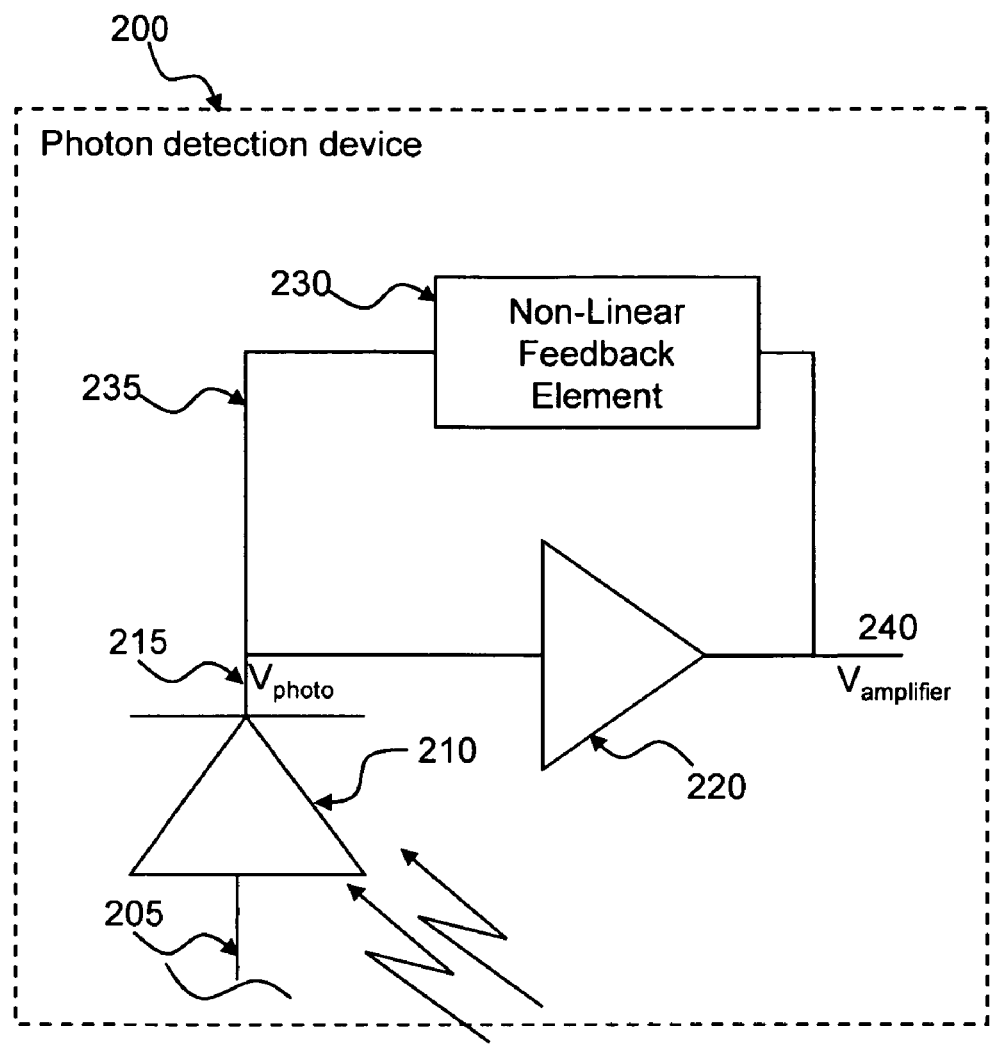
FIG. 2 is a schematic block diagram illustration of a photon detection device according to an embodiment of the invention.

Reference is now made to FIG. 2A. According to an embodiment of the invention, a photon detection device 200 comprises a photon-sensitive element 210, an amplifier 220 and a NLF element 230. Photon-sensitive element 210 may be implemented, e.g., as known in the art by, for example, a photodiode or by a photogate adapted to separate generated electron-hole pairs by means of a suitably applied electrical field applied on the same.

The path of NLF element 230 may be referred to as "feedback path" 235 and may employ a differential or variable resistance, the value of which depends on the electric current flowing through feedback path 235 as outlined henceforth in greater detail.

Photon detection device 200 may be operable in a first and in a second mode, wherein in a readout cycle, both modes are triggered once. The first mode, hereinafter referred to as "steady-state mode", may be defined as the mode in which generally only dark current is present in photon-sensitive element 210, i.e., photon-sensitive element 210 does not detect photons and is configured to be biased in forward direction. Since only dark current flows in photon-sensitive element 210, the difference in voltages between $V_{photo}$ thereof and $V_{amplifier}$ of photon detection device 200 depends on the resistance exhibits by NLF element 230 on said dark current flowing via feedback path 235. Under normal conditions, the dark current is low, thereby causing NLF element 230 to employ a high resistance such that substantially no electrical current (optionally except a current for compensating the dark current) may flow via feedback path 235. Correspondingly, in the steady-state mode, photon detection device 200 basically behaves like an open-loop circuit, i.e., the voltage $V_{photo}$ at the output of photon-sensitive element 210 is directly amplified by amplifier 220.

The second mode, hereinafter referred to as "transient mode" may be defined as the mode in which photon-sensitive element 210 detects photons, whereby the detection results in the excitation of charges in photon-sensitive element 210, which may then be amplified, readout and reset. More specifically, in the transient mode, the excitation of charges in photon-sensitive element 210 may cause a change in the voltage at $V_{photo}$. The change in the voltage is amplified by amplifier 220 and may be readout as $V_{amplifier}$. The excitation of charges in photon-sensitive element 210 causes the flow of current through feedback path 235 via NLF element 230 back to photon-sensitive element 210. The current flowing through NLF element 230 resets the number of charges excited and collected in photon-sensitive element 210, thereby reverting photon detection device 200 into the first, steady-state mode.

Figure 3A:
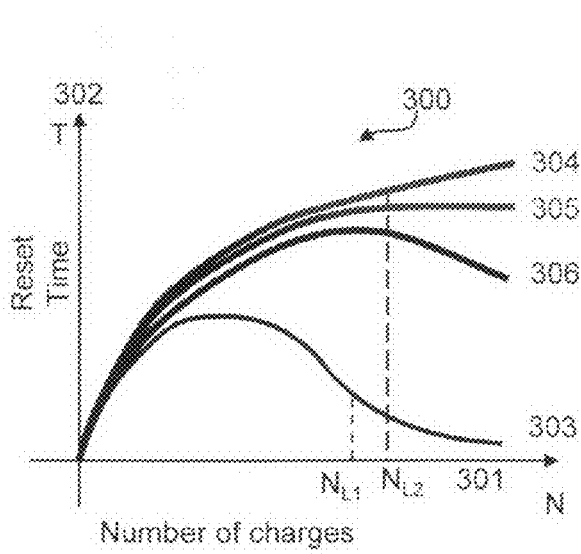
FIG. 3A is a schematic illustration of curves delineating the number of charges versus the required reset time, according to respective embodiments of the invention.

NLF element 230 is responsively coupled to photon-sensitive element 210 such that the time required for resetting of the charges in photon-sensitive element 210 depends on the amount of excited and collected charges, as is schematically illustrated herein with reference to FIG. 3A, wherein a first axis 301 and a second axis 302 constitute a Cartesian coordinate system 300. First axis 301 schematically depicts the number of charges N in photon-sensitive element 210, and second axis 302 schematically depicts the required reset time T. Correspondingly, curve 303, curve 304, curve 305 and curve 306 schematically disclose the reset time of photon-sensitive element 210 in accordance to respective embodiments of the invention. As is schematically illustrated by means of said curves, a change in reset time is disproportional or non-linear to the change in the amount of excited charges in embodiments of the invention. More specifically, NLF element 230 exhibits a non-linear voltage-to-current conversion.

The non-linearity of the reset time to the number of excited charges is such that the values of the derivates respective to curves 303, 304, 305 and 306 are decreasing at least up to a certain number of $N_{Ln}$ charges, i.e., the ratio between an increase in the reset time ΔT and the increase in the number of charges ΔN may decrease at least up to a certain number of $N_{Ln}$ charges. For example, as is schematically indicated with graph 303, the values of the derivative of curve 303 may decrease up to $N_{L1}$ (e.g. 1000) charges and increase therefrom. Alternatively, as is schematically indicated with curves 304, 305 and 306, the values of the respective derivative may decrease up to $N_{L2}$ (e.g. 1200) charges and may remain constant therefrom at a certain value K. As is exemplified with graphs 304, 305 and 306 said constant value K may generally be larger than zero, equal to zero or negative, respectively.

For example, a given number of N (e.g. 200) charges may be reset within T (equaling e.g. 4 μS), then a given number of 4*N (=800) charges may be reset within 3*T (=12 μS), and not within approximately 4*T (=16 μS) as would occur if a linear feedback element was employed instead of NLF element 230. Correspondingly, an increase in the number of charges N causes a decrease in the ratio between the reset time T and the number of charges N.

The behavior of the curves delineating the number of charges N versus the reset time T primarily depends on the implementation of NLF element 230. It should be noted that the illustration of curves 303, 304, 305 and 306 are for exemplifying purposes only, as respective embodiments of photon detection device 200 may yield different or similar corresponding behaviors of the number of N charges versus the reset time T. Moreover, the curves as schematically illustrated in FIG. 3A are exemplified with respect to the relevant nominal operating levels of embodiments of photon detection device 200, i.e., the curves are schematic illustrations of non-linear reset times for those photon frequencies that are detectable by photon-sensitive element 210.

Due to the relatively faster reset time which is enabled by employing NLF element 230, the resetting of photon-sensitive element 210 into the steady-state mode occurs faster compared to photon detection devices used in the art. For example, the time during which photon detection device 200 is in the transient mode may be shorter by a factor of, e.g., at least 2, than in photon detection devices used in the art. Accordingly, if a photon-sensitive element 210 of a photon detection device as used in the art may be saturated upon the detection of X photons, then photon-sensitive element 210 of photon detection device 200 may only be saturated upon the detection of 2*X or more photons. More photon packets are thus detectable by photon detection device 200 within a given time span than in devices used in the art and the photon detection device 200 is less susceptible to saturation prevented in a more efficient manner due to the faster reset of the number of charges in photon-sensitive element 210 upon their excitation. For example, a photon-sensitive element 210 when being employed in a device as used in the art may be reset after 1 ms or more, (e.g. after the excitation of 100,000 electrons), whereas photon-sensitive element 210, when being employed in embodiments of the photon detection device 200, may in a one embodiment of the invention be reset within less than 100 μs, and preferably within less than 60 μs, and in another embodiment of the invention be reset within less than 10 μs, and preferably within less than 6 μs. The optimal reset time is application specific and may correspond, inter alia, to the decay time of a scintillator media. If for example, the decay time of a scintillator medium is less than 6 μs, then the reset time should preferably also be less than 6 μs. On the other hand, if the decay time is for example about 100 μs, then the optimal reset time may also be around 100 μs or less.

NLF element 230 resets the number of charges in photon-sensitive element 210 (i.e., biases photon-sensitive element 210) to operate in its nominal operating level. Further, according to some embodiments of the invention, amplifier 220 is responsively coupled to NLF element 230 such that amplifier 220 is biased to operate in its corresponding operating level. The term "operating level" as used herein may be defined as the dynamic range at which an electronic component is designed to operate.

In some embodiments of the invention, amplifier 220 may be designed such to invert a change in the voltage $V_{photo}$ and to employ a gain G of, for example, at least 100 to the same voltage $V_{photo}$, regardless of the mode in which photon detection device 200 is set, wherein the change in the voltage $V_{photo}$ corresponds to the type of charges (holes or electrons) collected in photon-sensitive element 210. The inversion and amplification of $V_{photo}$ may be readout as voltage $V_{amplifier}$.

Figure 3B:
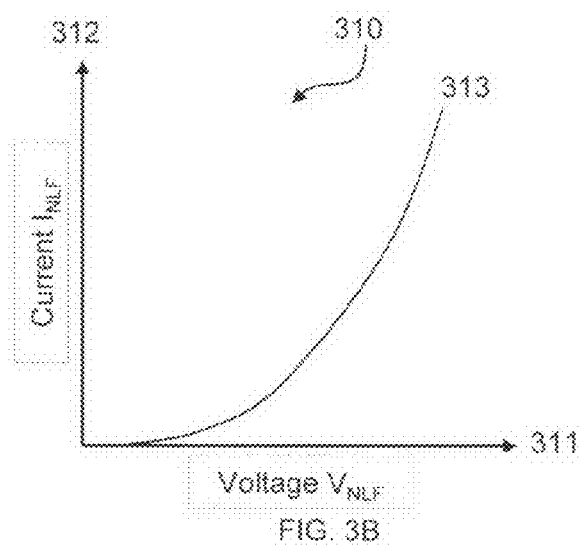
FIG. 3B is a schematic illustration of a curve delineating a voltage-to-current converting behavior of a non-linear feedback element by means of a coordinate system employing a linear scale, according to an embodiment of the invention.
Figure 3C:
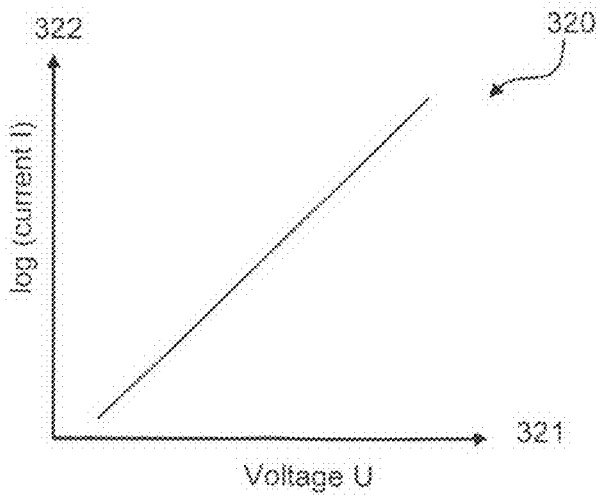
FIG. 3C is a schematic illustration of a curve delineating a voltage-to-current converting behavior of a non-linear feedback element by means of a coordinate system employing a logarithmic scale, according to an embodiment of the invention.

Further reference is now made to FIG. 3B and to FIG. 3C. The non-constant voltage change or non-linear current-to-voltage conversion employed by NLF element 230 may in some embodiments of the invention behave in accordance to logarithmic function, for example, as follows:

$$I_{NLF} \approx e^{V_{NLF}} \quad (4)$$

$$\rightarrow V_{NLF} = \ln(I_{NLF}) \quad (5)$$

Equations 4 and 5 are schematically illustrated in FIG. 3A and FIG. 3B, respectively.

The variable resistance employed by NLF element 230 on the current flowing there trough may thus be derived as follows:

$$\Delta R_{NLF} = \frac{dV_{NLF}}{dI_{NLF}} = \frac{1}{I_{NLF}} \quad (6)$$

The variable resistance employed by NLF element 230 compresses therefore pulses of charges excited in photon-sensitive element 210 due to visible photons 20 that are engaging with photon-sensitive element 210.

Figure 4:
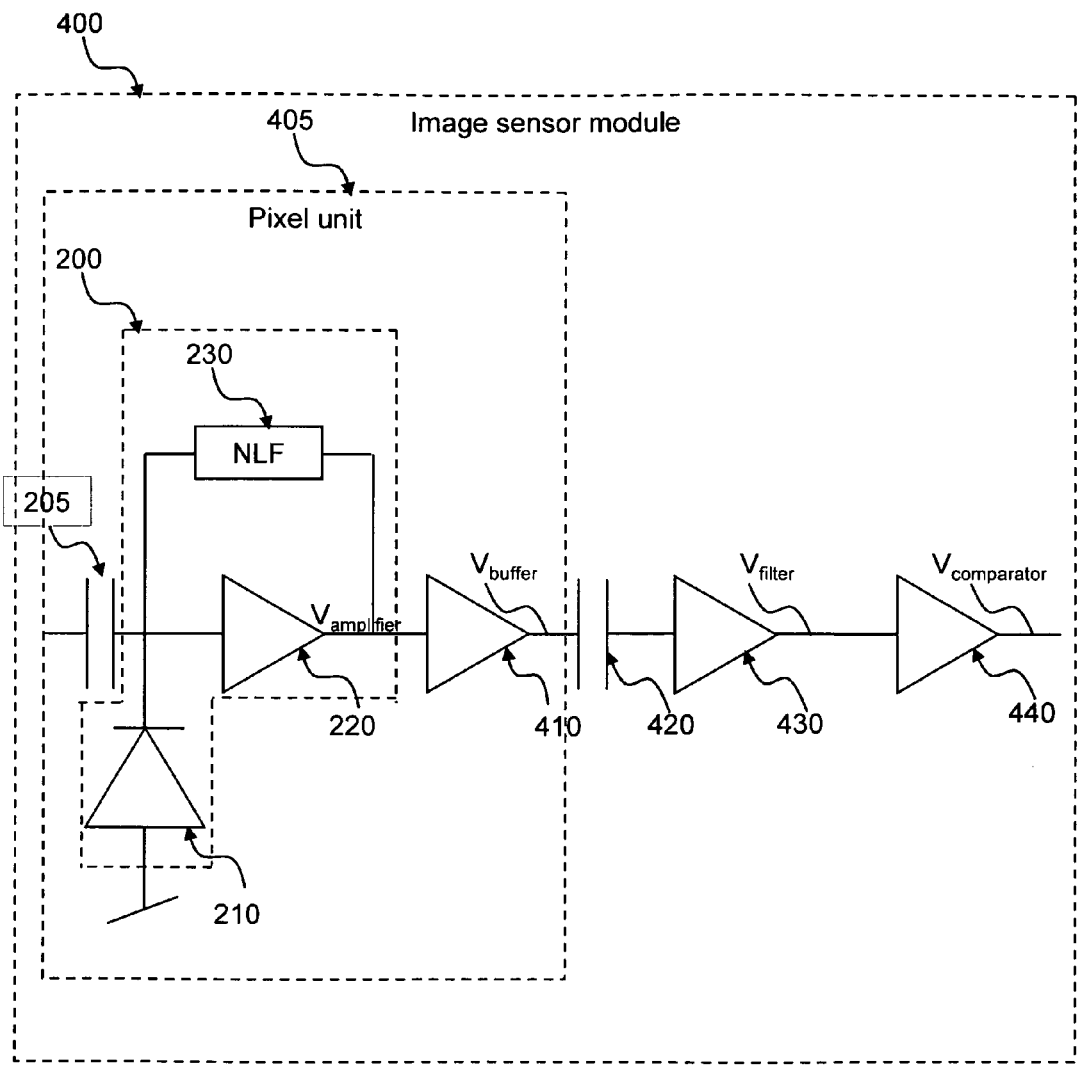
FIG. 4 is a schematic block diagram illustration of an photon detection device, according to some embodiments of the invention.
Figure 5:
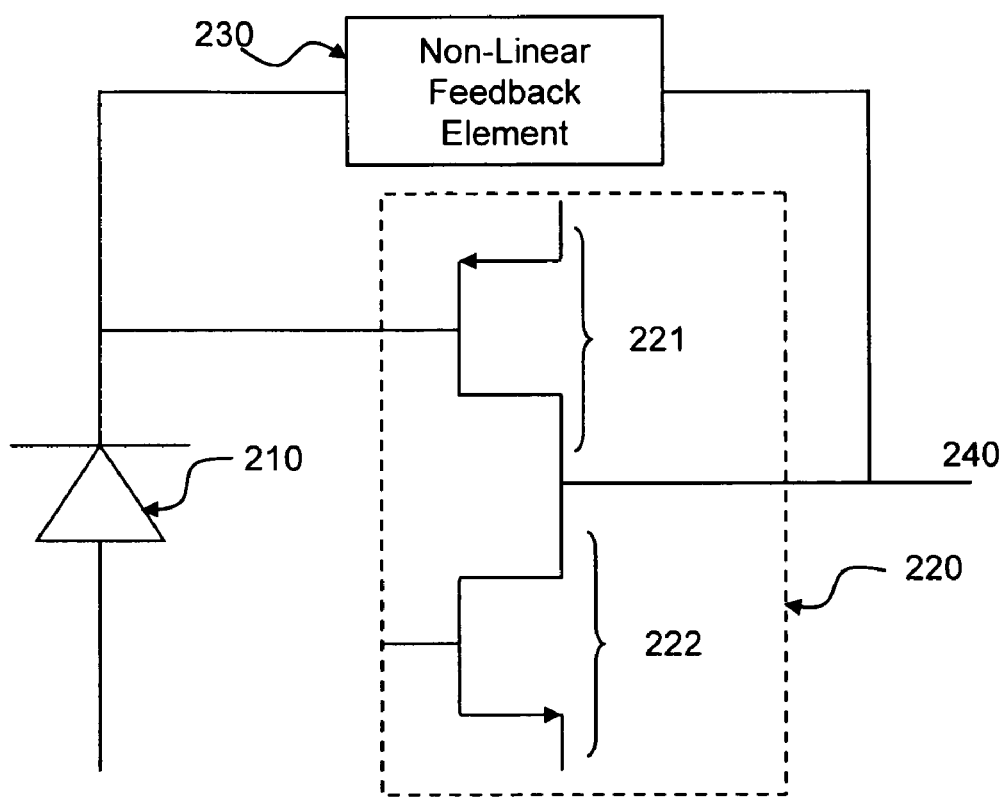
FIG. 5 is a schematic block diagram illustration of an implementation of an amplifier, according to some embodiments of the invention.
Figure 6A:
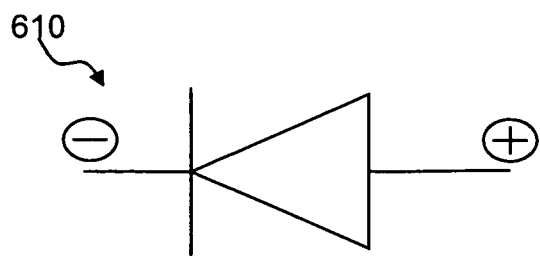
FIG. 6A is a schematic block diagram illustration of a non-linear feedback element implemented by means of a diode, according to an embodiment of the invention.
Figure 6B:
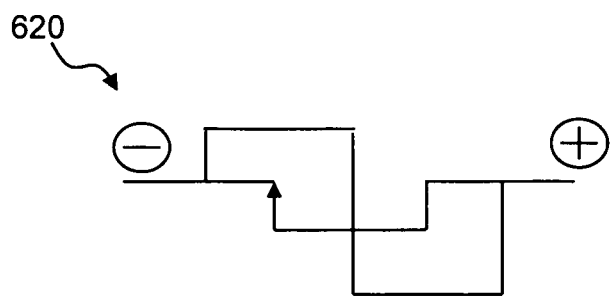
FIG. 6B is a schematic block diagram illustration of a non-linear feedback element implemented by means of an n-type metal-oxide semiconductor (MOS) field effect-transistor (FET), according to an embodiment of the invention.
Figure 6C:
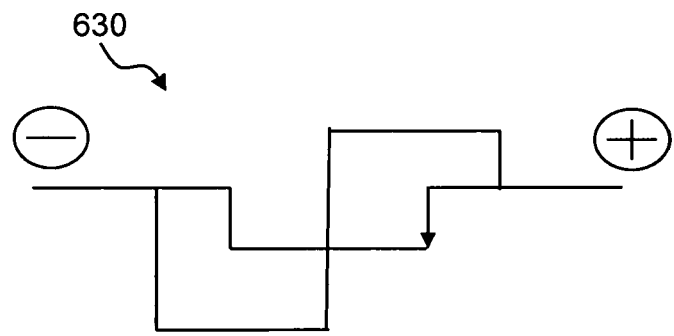
FIG. 6C is a schematic block diagram illustration of a non-linear feedback element implemented by means of an p-type metal-oxide semiconductor (MOS) field effect-transistor (FET), according to an embodiment of the invention.
Figure 6D:
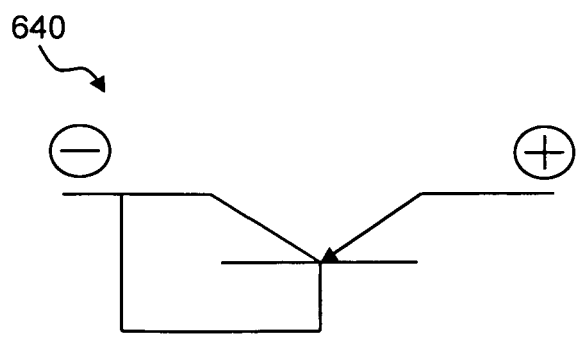
FIG. 6D is a schematic block diagram illustration of a non-linear feedback element implemented by means of a bipolar transistor, according to an embodiment of the invention.

Reference is now made to FIG. 4 and to FIG. 5. According to some embodiments of the invention, an image sensor module 400 may comprise a pixel unit 405 that includes at least one buffer, which is operatively coupled in series to the output of amplifier 220. For exemplary purposes only, the at least one buffer is herein referred to as "buffer 410". To the output of buffer 410, which may constitute the output of pixel unit 405, a capacitance 420, a high-pass filter 430 and a comparator 440 may be responsively coupled in series. In some embodiments, a capacitance 205 may be coupled in series to the input of amplifier 220.

High-pass filter 430 may be adapted to extract pulses of voltages corresponding to charges excited in photon-sensitive element 210; to suppress low-frequency noise; and may optionally filter out variations of nominal operating levels of amplifier 220, thereby enabling readout of voltage pulses generated due to the engagement of visible photons 20 with photon-sensitive element 210. Such variations of nominal operating levels may occur due to threshold variations of field-effect-transistor (FET)-based amplifier (cf. FIG. 5).

Filter 430 may have relatively low impedance compared to photon detection device 200. Therefore, in order to reduce or to minimize attenuate or distortion between the signal $V_{amplifier}$ and the signal voltage input to filter 430, pixel unit 405 may employ, between amplifier 220 and filter 430, in series, buffer 410 and optionally capacitance 420. Moreover, as already outlined hereinabove, pixel unit 405 may further comprise comparator 440, which may be designed such that $V_{comparator}$ attains the form of pulses, which may be induced whenever the output $V_{filter}$ equals or is above a certain threshold, thereby signaling that a charge pulse has reached the photon-sensitive element 210. Correspondingly, comparator 440 acts as a filter suppressing low-frequency signals.

Reference is now made to FIG. 5. Generally, amplifier 220 may be implemented, e.g., as known in the art to invert the voltage $V_{photo}$ and to attain a gain G of, for example, at least 100. Amplifier 220 may employ, for example, a set of transistors comprising at least one p-type and at least one n-type transistor. Each transistor may be implemented by both one of a metal-oxide field effect transistor (MOSFET) and a junction field-effect transistor (JFET). Whether a p-type or an n-type transistor is operatively coupled to the output of photon-sensitive element 210 depends on the type of charges collected in the same. If for example electron charges are collected in photon-sensitive element 210, then amplifier 220 may for example be implemented by means of two MOSFETs such as a p-type junction-gate MOSFET 221 that is operatively coupled to an n-type junction-gate MOSFET 222, wherein the gate of FET 221 is operatively coupled to the output of photon-sensitive element 210, and wherein the gate of FET 222 may be biased, e.g., as known in the art.

Additional reference is now made to FIG. 6A, FIG. 6B, FIG. 6C and FIG. 6D. NLF element 230 may be embodied by at least one of the following devices: a diode 610 (FIG. 6A), which may be built by a semiconductor material having two contrarily doped areas; and/or by a transistor such as, for example, an n-type metal-oxide semiconductor (MOS) field effect-transistor (FET) 620 (FIG. 6B); a p-type MOS FET 630 (FIG. 6C); and a bipolar transistor 640 (FIG. 6D) (e.g. npn- and/or pnp-bipolar transistor). Both n-type MOSFET 620 and p-type MOSFET 630 as well as bipolar transistor 640 may have diode-like operational characteristics, and may thus be employed to embody NLF element 230. Additionally or alternatively, NLF element 230 may be embodied by other types of transistors or combination of transistors such as, for example, junction field-effect (JFET) transistors.

Reverting now to FIG. 4, Buffer 410 may be implemented by means of amplifier-based buffers or by a transistor follower.

Therefore, pixel unit 405 may employ or comprise maximal four transistors (two for amplifier 220, one for NLF element 230, and one for buffer 410), rendering pixel unit 405 robust whilst saving space, whereby the most savings in space saving are due to the small area of non-linear feed-back element 230 compared to a linear feed-back element having similar resistance as used in the art. Pixel unit 405 may, for example, cover an area which is 100 times smaller than the area covered by pixel units used in the art. The increase in robustness is caused by the few number of employed transistors and/or the small area covered by pixel unit 405, therefore lowering the probability that the circuitry of pixel unit 405 is hit by an X-ray photon.

According to some embodiments of the invention, when photon-sensitive element 210 is employed similar to what is described, e.g., by Llopart et al. in connection with the Medipix2 chip detector, then photon-sensitive element 210 may be adapted to detect photons of radiation being outside the visible spectrum such as, for example, gamma rays, proton rays, neutron rays and X-ray radiation. Such a detector may be a strip or pixel detector and may in a given embodiment of the invention be included in the same substrate as amplifier 220, NLF element 230 and buffer 410. Alternatively, a strip or pixel detector may be included in a separate substrate, thereby implementing a hybrid configuration. Amplifier 220, NLF element 230 and buffer 410 may thus be employed in association with a direct-conversion photon detection device, which may be implemented, e.g., as known in the art.

Figure 7:
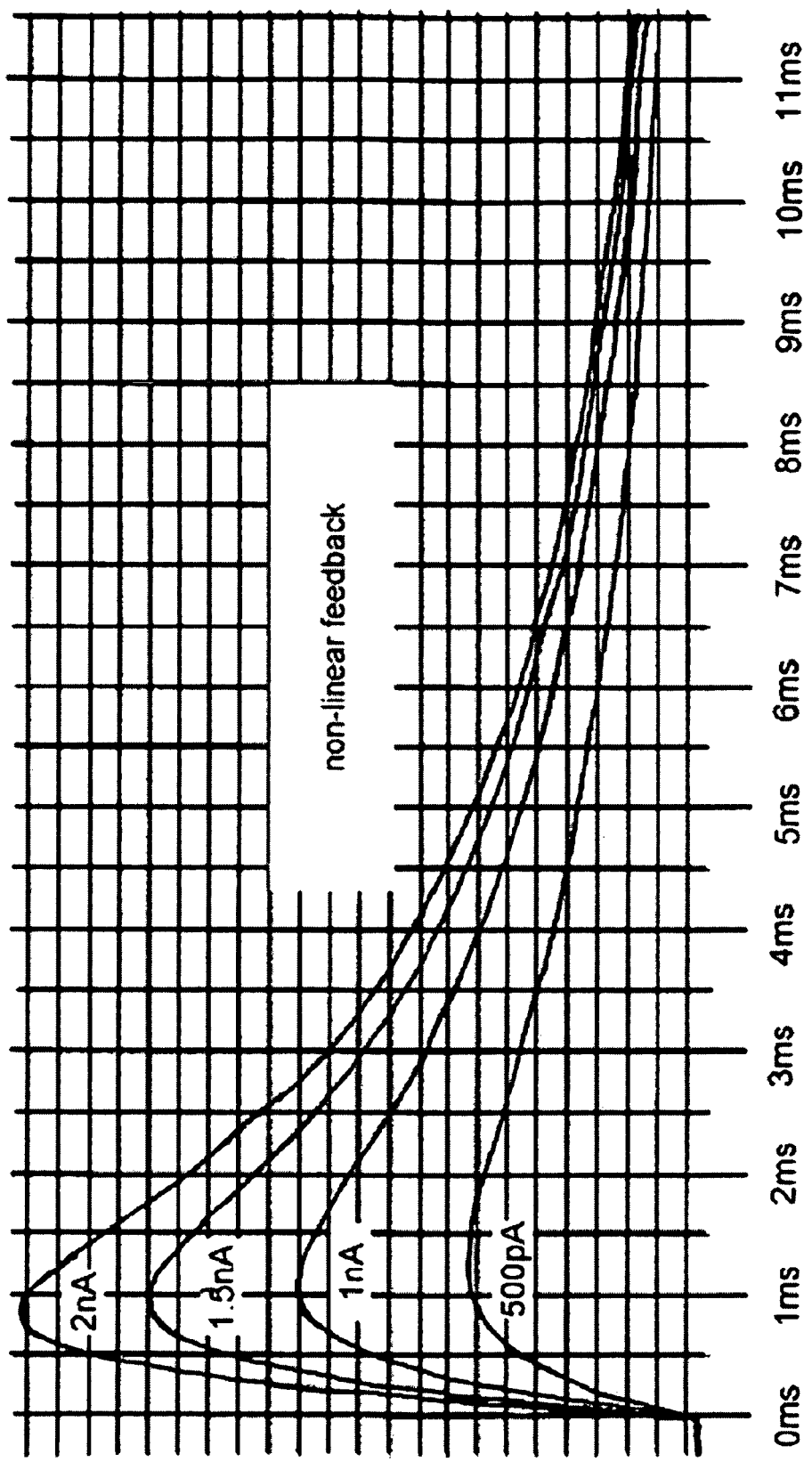
FIG. 7 is a schematic illustration of curves delineating current pulses and the corresponding reset times, when employing photon detection devices according to embodiments of the invention.

Reference is now made to FIG. 7, which schematically illustrates for various current pulses the respective reset time of photon-sensitive element 210 employed in photon detection device 200.

Embodiments of the present invention may have various advantageous over devices and systems used in the art. For example, in comparison to the devices disclosed in the respective publications to Lechner, Llopart et al. and Krummenmacher; embodiments of photon detection device 200 require much less electronic circuitry and/or transistors and require therefore much less space on the substrate. As a consequence, embodiments of photon detection device 200 may enable obtaining a spatial resolution of incoming photons, which may be useful in imaging applications.

Embodiments of photon detection device 200 may be used as detection means in an X-ray sensor such as, for example, X-ray sensor 100, to enable the counting of visible photons 20 generated as a result of X-ray radiation 10 engaging with scintillator medium 110.

While the invention has been described with respect to a limited number of embodiments, these should not be construed as limitations on the scope of the invention, but rather as exemplifications of some of the embodiments. Those skilled in the art will envision other possible variations, modifications, and programs that are also within the scope of the invention.

What is claimed is:

1. A photon detection device adapted to detect at least one packet of photons, said photon detection device comprising:
   a photon-sensitive element having an output, said photon-sensitive element generating charges upon the engagement of at least one photon packet therewith;
   an amplifier; and
   a non-linear feedback (NLF) element;
   wherein an increase from a first number of charges in said photon-sensitive element to a second number of charges, results in a corresponding increase of a first reset time required to reset said first number of charges to a respective second reset time required to reset said second number of charges in said photon-sensitive element; and
   wherein said amplifier and said NLF element are responsively coupled to said photon-sensitive element, such that a first ratio between said first reset time and said first number of charges is higher than a second ratio between said second reset time and said second number of charges, at least up to a number of $N_L$ charges.

2. The photon detection device of claim 1, wherein said NLF element is embodied by at least one of the following devices: a diode; and a transistor.

3. The photon detection device of claim 1, wherein the number of charges of said photon-sensitive element is reset within less than 100 µs, preferably within less than 60 µs, more preferably within less than 10 µs, and most preferably within less than 6 µs.

4. The photon detection device of claim 1, wherein said amplifier is designed to invert a change in the voltage at the output of said photon-sensitive element and to effect a gain of at least 100.

5. The photon detection device of claim 1, wherein said amplifier is implemented by means of at least one set of transistors, wherein each set comprises at least one n-type and at least one p-type transistor, wherein the transistor type that is operatively coupled to the output of said photon-sensitive element depends on the charges collected in said photon-sensitive element, and wherein each transistor of each set may be implemented by both one of a metal-oxide field-effect transistor (MOSFET) and a junction field-effect transistor (JFET).

6. The photon detection device of claim 5, wherein said at least one set of transistors is implemented by a p-type MOSFET and by an n-type MOSFET.

7. The photon detection device of claim 1, wherein at least one buffer is operatively coupled to said amplifier's output, said at least one buffer and said photon detection device constituting a pixel unit.

8. The photon detection device of claim 7, wherein said pixel unit employs maximal four transistors.

9. The photon detection device of claim 1 being adapted to detect photons emitted by a scintillator media.

10. The photon detection device of claim 1, wherein said photon-sensitive element is adapted to detect photons outside the visible spectrum.

11. The photon detection device of claim 1, wherein said NLF element employs a non-linear current-to-voltage conversion, said conversion behaving in accordance to a logarithmic function.

* * * * *

UNITED STATES PATENT AND TRADEMARK OFFICE
CERTIFICATE OF CORRECTION

| | | |
|---|---|---|
| PATENT NO. | : 7,547,889 B2 | Page 1 of 1 |
| APPLICATION NO. | : 12/075815 | |
| DATED | : June 16, 2009 | |
| INVENTOR(S) | : Michael Lehmann et al. | |

It is certified that error appears in the above-identified patent and that said Letters Patent is hereby corrected as shown below:

Column 5, line 22, "Liopart" should read --Llopert--; and

Column 5, line 54, Equation (1) reads:

$$" I_{sig} - I_{pulse} \cdot e^{-t/\tau} "$$

should read as follows:

$$-- I_{sig} = I_{pulse} \cdot e^{-t/\tau} --.$$

Signed and Sealed this

Thirty-first Day of May, 2011

David J. Kappos
*Director of the United States Patent and Trademark Office*